(12) United States Patent
Matas

(10) Patent No.: US 10,762,684 B2
(45) Date of Patent: *Sep. 1, 2020

(54) ANIMATION SEQUENCE ASSOCIATED WITH CONTENT ITEM

(71) Applicant: Facebook, Inc., Menlo Park, CA (US)

(72) Inventor: Michael Matas, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 838 days.

This patent is subject to a terminal disclaimer.

(21) Appl. No.: 14/992,413

(22) Filed: Jan. 11, 2016

(65) Prior Publication Data

US 2016/0125636 A1 May 5, 2016

Related U.S. Application Data

(63) Continuation of application No. 13/677,256, filed on Nov. 14, 2012, now Pat. No. 9,235,321.

(51) Int. Cl.
*G06T 13/80* (2011.01)
*G06F 3/0481* (2013.01)
(Continued)

(52) U.S. Cl.
CPC .......... *G06T 13/80* (2013.01); *G06F 3/0483* (2013.01); *G06F 3/0485* (2013.01);
(Continued)

(58) Field of Classification Search
CPC ............... G06F 3/0488; G06F 3/04842; G06F 3/04845; G06F 3/04847; G06F 3/04817;
(Continued)

(56) References Cited

U.S. PATENT DOCUMENTS

| 5,422,993 A | 1/1995 | Fleming |
| 5,430,494 A | 7/1995 | Saeger |

(Continued)

FOREIGN PATENT DOCUMENTS

| EP | 2 487 603 | 8/2012 |
| EP | 2 518 646 | 10/2012 |

(Continued)

OTHER PUBLICATIONS

Notification of Reasons for Rejection for JP 2016-097913, dated Nov. 15, 2016.

(Continued)

*Primary Examiner* — Maryam M Ipakchi
(74) *Attorney, Agent, or Firm* — Jordan IP Law, LLC

(57) ABSTRACT

In one embodiment, a method includes displaying a first content item on a screen of a computing device, the first content item occupying the entire screen and comprising an icon representing a second content item; and in response to a first user input, displaying a first animation sequence depicting the icon opening up to reveal the second content item, the second content item eventually replacing the first content item and occupying the entire screen. Then, in response to a second user input, the method further includes displaying a second animation sequence depicting the second content item closing down and returning to the icon included in the first content item, the second content item eventually disappearing from the screen.

21 Claims, 12 Drawing Sheets

(51) Int. Cl.
*G06F 3/0483* (2013.01)
*G06F 3/0484* (2013.01)
*G06F 3/0488* (2013.01)
*G06F 9/451* (2018.01)
*G06F 3/0485* (2013.01)

(52) U.S. Cl.
CPC ........ *G06F 3/0488* (2013.01); *G06F 3/04817* (2013.01); *G06F 3/04842* (2013.01); *G06F 3/04845* (2013.01); *G06F 3/04883* (2013.01); *G06F 9/451* (2018.02)

(58) Field of Classification Search
CPC .. G06F 3/0482; G06F 3/0481; G06F 3/04883; G06F 3/0483; G06F 3/048; G06F 3/0485; G06F 3/04812; G06F 3/0484; G06F 9/451; G06T 13/80
See application file for complete search history.

(56) References Cited

U.S. PATENT DOCUMENTS

| | | | |
|---|---|---|---|
| 5,479,602 A * | 12/1995 | Baecker | G06F 3/04817 715/838 |
| 5,668,966 A | 9/1997 | Ono | |
| 5,692,175 A | 11/1997 | Davies | |
| 5,941,626 A | 8/1999 | Yamuro | |
| 6,141,018 A | 10/2000 | Beri | |
| 6,188,432 B1 | 2/2001 | Ejima | |
| 6,252,594 B1 | 6/2001 | Xia | |
| 7,109,975 B2 | 9/2006 | Fedorak | |
| 7,415,662 B2 | 8/2008 | Rothmuller | |
| 7,479,949 B2 | 1/2009 | Jobs | |
| 7,555,725 B2 | 6/2009 | Abramson | |
| 7,590,947 B1 | 9/2009 | Gay | |
| 7,930,646 B2 | 4/2011 | De Souza | |
| 7,945,852 B1 | 5/2011 | Pilskalns | |
| 8,051,089 B2 | 11/2011 | Gargi | |
| 8,131,118 B1 | 3/2012 | Jing | |
| 8,176,438 B2 | 5/2012 | Zaman | |
| 8,271,907 B2 | 9/2012 | Kim | |
| 8,275,394 B2 | 9/2012 | Mattila | |
| 8,287,383 B1 | 10/2012 | Etter | |
| 8,310,456 B2 * | 11/2012 | Kim | G06F 3/0485 345/173 |
| 8,327,284 B2 | 12/2012 | Marusich | |
| 8,327,289 B2 | 12/2012 | Butlin | |
| 8,386,935 B2 | 2/2013 | van Zwol | |
| 8,429,565 B2 | 4/2013 | Agarawala | |
| 8,442,265 B1 | 5/2013 | Bosworth | |
| 8,456,488 B2 | 6/2013 | Ubillos | |
| 8,464,176 B2 | 6/2013 | Van Dok | |
| 8,504,586 B2 | 8/2013 | Armstrong | |
| 8,540,570 B2 | 9/2013 | Janis | |
| 8,584,015 B2 | 11/2013 | Osten | |
| 8,584,027 B2 | 11/2013 | Quennesson | |
| 8,621,450 B2 | 12/2013 | Firman | |
| 8,667,418 B2 | 3/2014 | Chaudhri | |
| 8,677,283 B2 | 3/2014 | Fong | |
| 8,683,377 B2 | 3/2014 | Zuverink | |
| 8,683,378 B2 | 3/2014 | Bull | |
| 8,713,458 B2 | 4/2014 | Mattila | |
| 8,726,142 B2 | 5/2014 | Piantino | |
| 8,745,511 B2 | 6/2014 | Ducharme | |
| 8,749,610 B1 | 6/2014 | Gossweiler | |
| 8,799,818 B2 | 8/2014 | Kim | |
| 8,803,908 B2 | 8/2014 | Van Osten | |
| 8,811,771 B2 | 8/2014 | Shechtman | |
| 8,830,270 B2 | 9/2014 | Zaman | |
| 8,832,188 B1 | 9/2014 | Cierniak | |
| 8,843,519 B2 | 9/2014 | Armstrong | |
| 8,845,423 B1 | 9/2014 | Monahan | |
| 8,892,997 B2 | 11/2014 | Louch | |
| 8,898,562 B2 | 11/2014 | Tocchini | |
| 8,922,575 B2 | 12/2014 | Garside | |
| 8,938,690 B1 | 1/2015 | Khouri | |
| 9,047,644 B1 | 6/2015 | Terleski | |
| 9,081,410 B2 | 7/2015 | Matas | |
| 2002/0145620 A1 | 10/2002 | Smith | |
| 2003/0117425 A1 * | 6/2003 | O'Leary | G06F 3/0483 715/700 |
| 2003/0233650 A1 | 12/2003 | Zaner | |
| 2004/0095400 A1 | 5/2004 | Anderson | |
| 2004/0145593 A1 | 7/2004 | Berkner | |
| 2004/0164969 A1 | 8/2004 | Matsuda | |
| 2004/0218910 A1 | 11/2004 | Chang | |
| 2004/0252120 A1 | 12/2004 | Hunleth | |
| 2005/0091596 A1 | 4/2005 | Anthony | |
| 2005/0210410 A1 | 9/2005 | Ohwa | |
| 2005/0275636 A1 | 12/2005 | Dehlin | |
| 2006/0010382 A1 | 1/2006 | Ejiri | |
| 2006/0080621 A1 | 4/2006 | Park | |
| 2006/0095331 A1 | 5/2006 | O'Malley | |
| 2006/0161868 A1 | 7/2006 | Van Dok | |
| 2007/0038846 A1 | 2/2007 | Kadambi | |
| 2007/0061488 A1 | 3/2007 | Alagappan | |
| 2007/0150913 A1 | 6/2007 | Ando | |
| 2007/0168875 A1 * | 7/2007 | Kowitz | G06F 3/0485 715/764 |
| 2007/0236475 A1 | 10/2007 | Wherry | |
| 2007/0236477 A1 | 10/2007 | Ryu | |
| 2008/0009325 A1 | 1/2008 | Zinn | |
| 2008/0034381 A1 | 2/2008 | Jalon | |
| 2008/0057926 A1 | 3/2008 | Forstall | |
| 2008/0064438 A1 | 3/2008 | Calvet | |
| 2008/0098316 A1 | 4/2008 | Declan | |
| 2008/0133526 A1 | 6/2008 | Haitani | |
| 2008/0165153 A1 | 7/2008 | Platzer | |
| 2008/0168349 A1 | 7/2008 | Lamiraux | |
| 2008/0168384 A1 | 7/2008 | Platzer | |
| 2008/0168402 A1 | 7/2008 | Blumenberg | |
| 2008/0201649 A1 | 8/2008 | Mattila | |
| 2008/0270886 A1 * | 10/2008 | Gossweiler | H04N 21/26283 715/227 |
| 2008/0276269 A1 | 11/2008 | Miller | |
| 2008/0282202 A1 | 11/2008 | Sunday | |
| 2008/0294663 A1 | 11/2008 | Heinley | |
| 2008/0307360 A1 | 12/2008 | Chaudhri | |
| 2009/0007017 A1 | 1/2009 | Anzures | |
| 2009/0031232 A1 | 1/2009 | Brezina | |
| 2009/0044133 A1 | 2/2009 | Goto | |
| 2009/0063995 A1 | 3/2009 | Baron | |
| 2009/0064031 A1 | 3/2009 | Bull | |
| 2009/0064055 A1 | 3/2009 | Chaudhri | |
| 2009/0106687 A1 | 4/2009 | De Souza | |
| 2009/0132921 A1 | 5/2009 | Hwangbo | |
| 2009/0132933 A1 | 5/2009 | Faski | |
| 2009/0144392 A1 | 6/2009 | Wang | |
| 2009/0164602 A1 | 6/2009 | Kies | |
| 2009/0196510 A1 | 8/2009 | Gokturk | |
| 2009/0198359 A1 | 8/2009 | Chadhri | |
| 2009/0199082 A1 | 8/2009 | Hollander | |
| 2009/0228807 A1 | 9/2009 | Lemay | |
| 2009/0231271 A1 | 9/2009 | Heubel | |
| 2009/0237421 A1 * | 9/2009 | Kim | G06F 3/0485 345/661 |
| 2009/0281988 A1 | 11/2009 | Yoo | |
| 2009/0305732 A1 | 12/2009 | Marcellino | |
| 2009/0307623 A1 | 12/2009 | Agarawala | |
| 2009/0312033 A1 | 12/2009 | Shen | |
| 2009/0325607 A1 | 12/2009 | Conway | |
| 2010/0049534 A1 | 2/2010 | Whitnah | |
| 2010/0058226 A1 | 3/2010 | Flake | |
| 2010/0058240 A1 | 3/2010 | Bull | |
| 2010/0070628 A1 | 3/2010 | Harrang | |
| 2010/0158315 A1 | 6/2010 | Martin | |
| 2010/0162140 A1 | 6/2010 | Fereira | |
| 2010/0162174 A1 | 6/2010 | Karidi | |
| 2010/0179874 A1 | 7/2010 | Higgins | |
| 2010/0199180 A1 | 8/2010 | Brichter | |
| 2010/0211872 A1 | 8/2010 | Rolston | |
| 2010/0214321 A1 | 8/2010 | Hokkanen | |
| 2010/0274815 A1 | 10/2010 | Vanasco | |
| 2010/0275152 A1 | 10/2010 | Atkins | |

(56) References Cited

U.S. PATENT DOCUMENTS

| | | |
|---|---|---|
| 2010/0281409 A1 | 11/2010 | Rainisto |
| 2010/0313165 A1 | 12/2010 | Louch |
| 2010/0332958 A1 | 12/2010 | Weinberger |
| 2011/0010641 A1 | 1/2011 | Wolff |
| 2011/0083082 A1 | 4/2011 | Gottwald |
| 2011/0084962 A1 | 4/2011 | Kim |
| 2011/0093812 A1 | 4/2011 | Fong |
| 2011/0125846 A1 | 5/2011 | Ham |
| 2011/0126156 A1 | 5/2011 | Krishnaraj |
| 2011/0145753 A1 | 6/2011 | Prakash |
| 2011/0157188 A1 | 6/2011 | Nakagawa |
| 2011/0164058 A1 | 7/2011 | Lemay |
| 2011/0176720 A1 | 7/2011 | Van |
| 2011/0182485 A1 | 7/2011 | Shochat |
| 2011/0184772 A1 | 7/2011 | Norton |
| 2011/0184960 A1 | 7/2011 | Delphia |
| 2011/0191685 A1 | 8/2011 | Bamford |
| 2011/0196923 A1 | 8/2011 | Marcucci |
| 2011/0202866 A1 | 8/2011 | Huang |
| 2011/0231745 A1 | 9/2011 | Levesque |
| 2011/0231802 A1 | 9/2011 | Lee |
| 2011/0238690 A1 | 9/2011 | Arrasvuori |
| 2011/0258575 A1 | 10/2011 | Cupp |
| 2011/0276396 A1 | 11/2011 | Rathod |
| 2011/0307631 A1 | 12/2011 | Park |
| 2012/0010995 A1 | 1/2012 | Skirpa |
| 2012/0011430 A1 | 1/2012 | Parker |
| 2012/0016858 A1 | 1/2012 | Rathod |
| 2012/0023407 A1 | 1/2012 | Taylor |
| 2012/0023425 A1 | 1/2012 | Hackborn |
| 2012/0030568 A1 | 2/2012 | Migos |
| 2012/0030616 A1 | 2/2012 | Howes |
| 2012/0030636 A1 | 2/2012 | Miyazaki |
| 2012/0054684 A1 | 3/2012 | Gossweiler |
| 2012/0066304 A1 | 3/2012 | Marmon |
| 2012/0072957 A1 | 3/2012 | Cherukuwada |
| 2012/0096393 A1 | 4/2012 | Shim |
| 2012/0105489 A1 | 5/2012 | Monroe |
| 2012/0110474 A1 | 5/2012 | Chen |
| 2012/0113095 A1 | 5/2012 | Hwang |
| 2012/0131508 A1 | 5/2012 | Lee |
| 2012/0143701 A1 | 6/2012 | Reis |
| 2012/0147055 A1 | 6/2012 | Pallakoff |
| 2012/0154444 A1 | 6/2012 | Fernandez |
| 2012/0159635 A1 | 6/2012 | He |
| 2012/0167010 A1 | 6/2012 | Campbell |
| 2012/0169774 A1 | 7/2012 | Yu |
| 2012/0173994 A1 | 7/2012 | Ho |
| 2012/0179969 A1 | 7/2012 | Lee |
| 2012/0212668 A1 | 8/2012 | Schultz |
| 2012/0223951 A1 | 9/2012 | Dunn |
| 2012/0240071 A1 | 9/2012 | Park |
| 2012/0244841 A1 | 9/2012 | Teng |
| 2012/0249571 A1 | 10/2012 | Houjou |
| 2012/0262462 A1* | 10/2012 | Montan ............... G06T 13/80 345/473 |
| 2012/0278725 A1* | 11/2012 | Gordon ............. H04N 21/2665 715/738 |
| 2012/0278755 A1 | 11/2012 | Lehmann |
| 2012/0314912 A1 | 12/2012 | Nakagomi |
| 2012/0331053 A1 | 12/2012 | Dunn |
| 2013/0060744 A1 | 3/2013 | Roychoudhuri |
| 2013/0073970 A1 | 3/2013 | Piantino |
| 2013/0080881 A1 | 3/2013 | Goodspeed |
| 2013/0095857 A1 | 4/2013 | Garcia |
| 2013/0097566 A1 | 4/2013 | Berglund |
| 2013/0111391 A1 | 5/2013 | Penner |
| 2013/0139111 A1 | 5/2013 | Grimes |
| 2013/0141456 A1 | 6/2013 | Sokolov |
| 2013/0179504 A1 | 7/2013 | Adams |
| 2013/0187944 A1 | 7/2013 | Hamana |
| 2013/0191711 A1 | 7/2013 | Tashman |
| 2013/0271471 A1 | 10/2013 | Schorsch |
| 2013/0321444 A1 | 12/2013 | Efrati |
| 2013/0326398 A1 | 12/2013 | Zuverink |
| 2013/0332068 A1 | 12/2013 | Kesar |
| 2013/0346922 A1 | 12/2013 | Mattila |
| 2014/0040774 A1 | 2/2014 | Charytoniuk |
| 2014/0074471 A1 | 3/2014 | Sankar |
| 2014/0074652 A1* | 3/2014 | Wu ............... G06F 17/212 705/26.7 |
| 2014/0089816 A1 | 3/2014 | DiPersia |
| 2014/0115446 A1 | 4/2014 | Hall |
| 2014/0123021 A1 | 5/2014 | Walkin |
| 2014/0123081 A1 | 5/2014 | Park |
| 2014/0132638 A1 | 5/2014 | Matas |
| 2014/0136946 A1 | 5/2014 | Matas |
| 2014/0136959 A1 | 5/2014 | Matas |
| 2014/0136968 A1 | 5/2014 | Matas |
| 2014/0136995 A1 | 5/2014 | Matas |
| 2014/0137010 A1 | 5/2014 | Matas |
| 2014/0137011 A1 | 5/2014 | Matas |
| 2014/0137012 A1 | 5/2014 | Matas |
| 2014/0137013 A1 | 5/2014 | Matas |
| 2014/0137026 A1 | 5/2014 | Matas |
| 2014/0137030 A1 | 5/2014 | Matas |
| 2014/0137043 A1 | 5/2014 | Matas |
| 2014/0137046 A1 | 5/2014 | Matas |
| 2014/0344471 A1 | 11/2014 | Valko |
| 2014/0344716 A1 | 11/2014 | Martin |
| 2015/0040035 A1 | 2/2015 | Neelakant |
| 2015/0277691 A1 | 10/2015 | Matas |

FOREIGN PATENT DOCUMENTS

| | | |
|---|---|---|
| JP | 2007-121765 | 5/2007 |
| JP | 2007121765 A | 5/2007 |
| JP | 2009-49734 | 3/2009 |
| JP | 2009-223875 | 10/2009 |
| JP | 2009223875 A | 10/2009 |
| JP | 2010-86194 | 4/2010 |
| JP | 2010-092340 | 4/2010 |
| JP | 2011-203983 | 10/2011 |
| JP | 2012-34383 | 2/2012 |
| KR | 10-2001-0013878 | 2/2001 |
| KR | 10-2004-0073180 | 8/2004 |
| KR | 10-2012-0048522 | 5/2012 |
| WO | 2010/040201 | 4/2010 |
| WO | 2010/080256 | 7/2010 |
| WO | 2012/001637 | 1/2012 |
| WO | 2012/057897 | 5/2012 |
| WO | 2012/108722 | 8/2012 |
| WO | 2012/125426 | 9/2012 |
| WO | 2012/129336 | 9/2012 |
| WO | 2012/134756 | 10/2012 |
| WO | 2014/005222 | 1/2014 |

OTHER PUBLICATIONS

Notice of Allowance for U.S. Appl. No. 13/676,658, dated Nov. 9, 2015.
Notice of Allowance for U.S. Appl. No. 13/676,658, dated Oct. 13, 2015.
Notice of Allowance for U.S. Appl. No. 13/676,658, dated Sep. 28, 2015.
Notice of Allowance for U.S. Appl. No. 13/676,658, dated Sep. 10, 2015.
Response to Non-Final Office Action for U.S. Appl. No. 13/676,658, dated May 26, 2015.
Non-Final Office Action for U.S. Appl. No. 13/676,658, dated Feb. 25, 2015.
Notice of Allowance for U.S. Appl. No. 13/676,831, dated Dec. 3, 2015.
Notice of Allowance for U.S. Appl. No. 13/676,831, dated Jul. 22, 2015.
Response to Non-Final Office Action for U.S. Appl. No. 13/676,832, dated May 18, 2015.
Non-Final Office Action for U.S. Appl. No. 13/676,831, dated Mar. 4, 2015.
Notice of Allowance for U.S. Appl. No. 13/663,229, dated Oct. 9, 2015.

(56) References Cited

OTHER PUBLICATIONS

Response to Final Office Action for U.S. Appl. No. 13/663,229, dated Apr. 21, 2015.
Final Office Action for U.S. Appl. No. 13/663,229, dated Jan. 26, 2015.
Response to Non-Final Office Action for U.S. Appl. No. 13/663,229, dated Oct. 3, 2014.
Non-Final Office Action for U.S. Appl. No. 13/663,229, dated Jun. 3, 2014.
Response to Final Office Action for U.S. Appl. No. 13/663,229, dated Mar. 25, 2014.
Supplemental Response for U.S. Appl. No. 13/663,229, dated Mar. 20, 2014.
Final Office Action for U.S. Appl. No. 13/663,229, dated Sep. 25, 2013.
Response to Non-Final Office Action for U.S. Appl. No. 13/663,229, dated Aug. 12, 2013.
Non-Final Office Action for U.S. Appl. No. 13/663,229, dated Mar. 12, 2013.
Response to Non-Final Office Action for U.S. Appl. No. 13/677,002, dated Dec. 2, 2015.
Non-Final Office Action for U.S. Appl. No. 13/677,002, dated Sep. 24, 2015.
Response to Final Office Action for U.S. Appl. No. 13/677,002, dated Sep. 3, 2015.
Final Office Action for U.S. Appl. No. 13/677,002, dated Apr. 30, 2015.
Response to Non-Final Office Action for U.S. Appl. No. 13/677,002, dated Dec. 29, 2014.
Non-Final Office Action for U.S. Appl. No. 13/677,002, dated Jan. 6, 2014.
Response to Final Office Action for U.S. Appl. No. 13/677,002, dated Oct. 3, 2014.
Final Office Action for U.S. Appl. No. 13/677,002, dated May 22, 2014.
Response to Non-Final Office Action for U.S. Appl. No. 13/677,002, dated Feb. 6, 2014.
Non-Final Office Action for U.S. Appl. No. 13/677,002, dated Nov. 6, 2013.
Non-Final Office Action for U.S. Appl. No. 13/677,056, dated Nov. 19, 2015.
Response to Final Office Action for U.S. Appl. No. 13/677,056, dated Oct. 29, 2015.
Final Office Action for U.S. Appl. No. 13/677,056, dated Jun. 10, 2015.
Response to Non-Final Office Action for U.S. Appl. No. 13/677,056, dated Mar. 20, 2015.
Non-Final Office Action for U.S. Appl. No. 13/677,056, dated Dec. 12, 2014.
Notice of Allowance for U.S. Appl. No. 13/676,951, dated May 28, 2015.
Notice of Allowance for U.S. Appl. No. 13/676,951, dated Apr. 23, 2015.
Notice of Allowance for U.S. Appl. No. 13/676,951, dated Mar. 5, 2015.
Response to Final Office Action for U.S. Appl. No. 13/676,951, dated Feb. 12, 2015.
Final Office Action for U.S. Appl. No. 13/676,951, dated Feb. 23, 2014.
Response to Non-Final Office Action for U.S. Appl. No. 13/676,951, dated Nov. 6, 2014.
Non-Final Office Action for U.S. Appl. No. 13/676,951, dated Aug. 5, 2014.
Response to Final Office Action for U.S. Appl. No. 13/676,951, dated Apr. 4, 2014.
Final Office Action for U.S. Appl. No. 13/676,951, dated Dec. 4, 2013.
Response to Non-Final Office Action for U.S. Appl. No. 13/676,951, dated Sep. 18, 2013.
Non-Final Office Action for U.S. Appl. No. 13/676,951, dated Apr. 18, 2013.
Final Office Action for U.S. Appl. No. 13/677,222, dated Sep. 17, 2015.
Response to Non-Final Office Action for U.S. Appl. No. 13/677,222, dated Jun. 24, 2015.
Non-Final Office Action for U.S. Appl. No. 13/677,222, dated Mar. 27, 2015.
Response to Non-Final Office Action for U.S. Appl. No. 13/677,166, dated Dec. 10, 2015.
Final Office Action for U.S. Appl. No. 13/677,166, dated Sep. 17, 2015.
Response to Non-Final Office Action for U.S. Appl. No. 13/677,166, dated Jun. 24, 2015.
Non-Final Office Action for U.S. Appl. No. 13/677,166, dated Mar. 27, 2015.
Response to Non-Final Office Action for U.S. Appl. No. 13/677,104, dated Dec. 10, 2015.
Non-Final Office Action for U.S. Appl. No. 13/677,104, dated Sep. 24, 2015.
Response to Final Office Action for U.S. Appl. No. 13/677,104, dated Jul. 27, 2015.
Final Office Action for U.S. Appl. No. 13/677,104, dated Mar. 27, 2015.
Response to Non-Final Office Action for U.S. Appl. No. 13/677,104, dated Feb. 12, 2015.
Non-Final Office Action for U.S. Appl. No. 13/677,104, dated Dec. 10, 2014.
Non-Final Office Action for U.S. Appl. No. 13/677,266, dated Dec. 21, 2015.
Response to Final Office Action for U.S. Appl. No. 13/677,266, dated Oct. 28, 2015.
Final Office Action for U.S. Appl. No. 13/677,266, dated May 26, 2015.
Response to Non-Final Office Action for U.S. Appl. No. 13/677,266, dated Mar. 20, 2015.
Non-Final Office Action for U.S. Appl. No. 13/677,266, dated Dec. 22, 2014.
Response to Non-Final Office Action for U.S. Appl. No. 13/677,269, dated Dec. 10, 2015.
Final Office Action for U.S. Appl. No. 13/677,269, dated Sep. 10, 2015.
Response to Non-Final Office Action for U.S. Appl. No. 13/677,269, dated Jun. 9, 2015.
Non-Final Office Action for U.S. Appl. No. 13/677,269, dated Mar. 13, 2015.
Final Office Action for U.S. Appl. No. 13/677,247, dated Jun. 5, 2015.
Response to Non-Final Office Action for U.S. Appl. No. 13/677,247, dated May 18, 2015.
Non-Final Office Action for U.S. Appl. No. 13/677,247, dated Mar. 3, 2015.
Non-Final Office Action for U.S. Appl. No. 13/677,274, dated Dec. 9, 2015.
Response to Final Office Action for U.S. Appl. No. 13/677,274, dated Oct. 1, 2015.
Final Office Action for U.S. Appl. No. 13/677,274, dated Apr. 7, 2015.
Response to Non-Final Office Action for U.S. Appl. No. 13/677,274, dated Dec. 22, 2014.
Non-Final Office Action for U.S. Appl. No. 13/677,274, dated Dec. 22, 2014.
Notice of Allowance for U.S. Appl. No. 13/677,256, dated Nov. 17, 2015.
Notice of Allowance for U.S. Appl. No. 13/677,256, dated Sep. 21, 2015.
Supplemental Response for U.S. Appl. No. 13/677,256, dated Sep. 8, 2015.
Response to Non-Final Office Action for U.S. Appl. No. 13/677,256, dated Jul. 8, 2015.
Non-Final Office Action for U.S. Appl. No. 13/677,256, dated Mar. 30, 2015.

(56) References Cited

OTHER PUBLICATIONS

International Search Report and Written Opinion for International Applications No. PCT/US2013/067226, dated Feb. 10, 2014.
International Search Report and Written Opinion for International Applications No. PCT/US2013/067482, dated Feb. 19, 2014.
International Search Report and Written Opinion for International Applications No. PCT/US2013/067650, dated Feb. 19, 2014.
International Search Report and Written Opinion for International Applications No. PCT/US2013/068294, dated Feb. 26, 2014.
International Search Report and Written Opinion for International Applications No. PCT/US2013/067925, dated Feb. 19, 2014.
International Search Report and Written Opinion for International Applications No. PCT/US2013/068303, dated Feb. 13, 2015.
International Search Report and Written Opinion for International Applications No. PCT/US2013/068308, dated Feb. 13, 2014.
International Search Report for International Applications No. PCT/US2013/066289, dated Feb. 3, 2014.
"Ken Burns Effect," Wikipedia, http://en.wikipedia.org/w/index.php?title=Ken_Burns_effect&printable=yes (downloaded 9/18/12), Nov. 14, 2012.
White, Panning and Zooming in Premiere Pro CS5, Dec. 10, 2010, http://www.youtube.com/watch?v=_Okt6OVAyb8, Mar. 4, 2015.
Kawahara sense et al., "It Can be in the Facebook API, Web API Coding for the 'Social' Site Constructions," Japan, MDN Corp., Ltd. Fujioka Koh, first edition, pp. 26-31—no English translation available, May 1, 2011.
Examination Search Report for CA 2,889,732, dated Oct. 9, 2015.
Notification of Reasons for Rejection for JP Patent Application 2015-543075, dated Nov. 24, 2015.
Notification of Reasons for Rejection for JP 2015-543092, dated Jan. 5, 2016.
Examination Report No. 1 for AU 2013345198, dated Jan. 13, 2016.
Notice of Preliminary Rejection for Korean Patent Application No. 10-2015-7015662, dated Feb. 29, 2016.
Examination Report No. 1 for Patent Application No. 2016203008, dated Jun. 16, 2017.
KR Office Action received from KIPO for Patent Application No. 10-2016-70275868. (with English Translation), dated Aug. 13, 2019.
Examination Report for Canadian Patent Application No. 2,929,099, dated Aug. 28, 2019, 5 pages.

\* cited by examiner

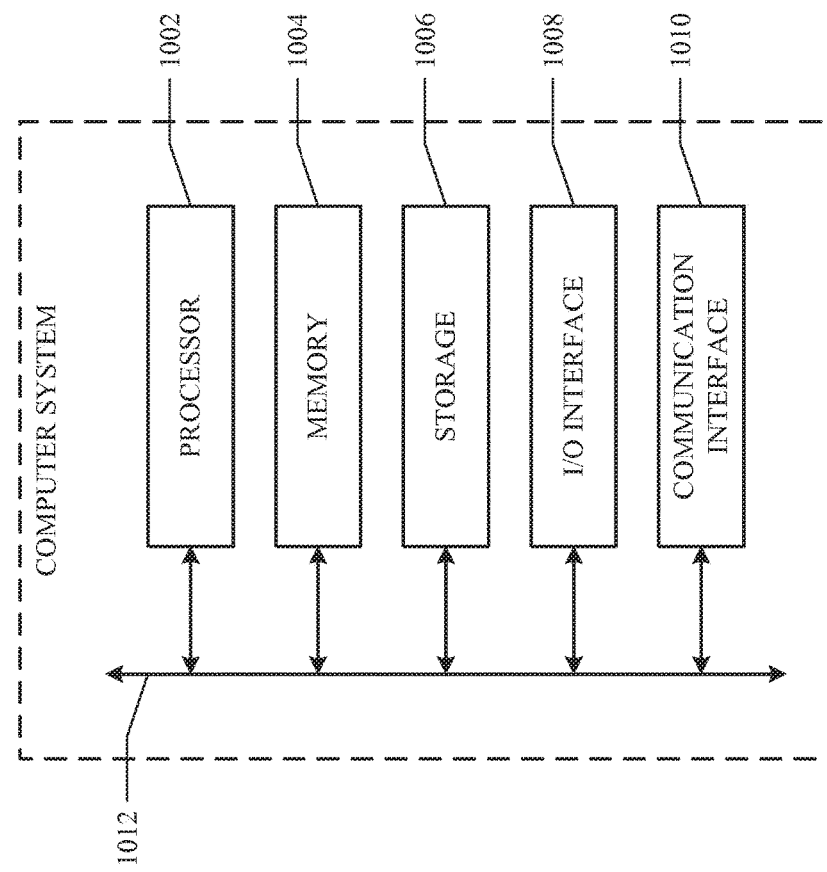

ANIMATION SEQUENCE ASSOCIATED WITH CONTENT ITEM

RELATED APPLICATIONS

This application is a continuation under 35 U.S.C. § 120 of U.S. patent application Ser. No. 13/677,256, filed 14 Nov. 2012 and issued as U.S. Pat. No. 9,235,321, which is incorporated herein by reference.

TECHNICAL FIELD

This disclosure generally relates to a user interface.

BACKGROUND

A user interface (UI), in the industrial design field of human-machine interaction, is the space where interactions between humans and machines occur. The goal of the interactions between a human, often referred to as a "user", and a machine at the user interface is the user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands.

SUMMARY OF PARTICULAR EMBODIMENTS

In particular embodiments, a user interface for presenting content to users may have a hierarchical structure. The user interface may have any number of content sections, and each content section may have any number of content items. The content items may be of any type or format. A user may consume or interact with some of the content items. In particular embodiments, each content item may correspond to a user-interface element.

In particular embodiments, in a hierarchical user interface, a content item may include any number of other content items. In such cases, within the hierarchical structure, the content item may be considered the parent of the other content items it includes, and conversely, the other content items may be considered the children of the content item to which they belong.

In particular embodiments, a first content item may include an icon, such as an image, that represents a second content item. In response to a first user interaction with the icon, the icon may open up to reveal the full content of the second content item. When this happens, with some implementations, the second content item replaces the first content item to be displayed on the screen of a computing device. The user may then view the content of the second content item. In response to a second user interaction with the second content item, the second content item may close down and return to the icon included in the first content item. When this happens, with some implementations, the second content item goes away and the first content item, including the icon representing the second content item, is again displayed on the screen of the computing device.

In particular embodiments, a first animation sequence is displayed when the icon opens up to reveal the second content item, depicting the opening up of the icon into the second content item. A second animation sequence is displayed when the second content item closes down to the icon, depicting the closing down of the second content item back to the icon.

BRIEF DESCRIPTION OF THE DRAWINGS

FIG. 10 illustrates an example computer system.

DESCRIPTION OF EXAMPLE EMBODIMENTS

A user interface (UI) may be incorporated into any type of software applications, including, for example, desktop applications, mobile applications, or web-based applications, to enable users to interact with and control the applications. A graphical user interface (GUI) is a type of user interface that enables users to interact with software applications through multi-media objects, including, for example, icons, buttons, menus, images, video, or audios.

Figure 1:
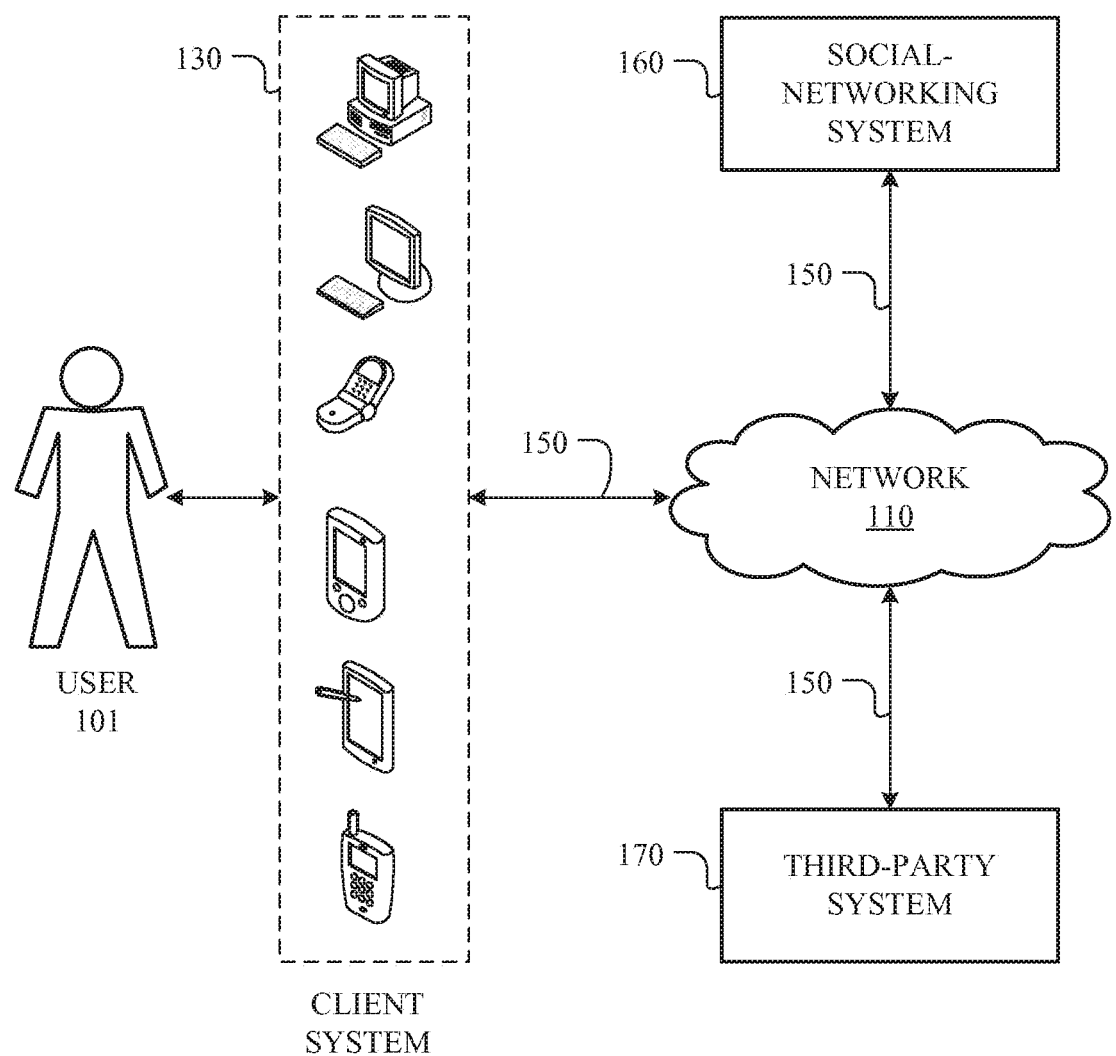
FIG. 1 illustrates an example network environment associated with a social-networking system.

In particular embodiments, a software application may be associated with a social-networking system. FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various third-party software applications (e.g., web-based applications). Third-party system 170 may generate, store, receive, and transmit various types of data, such as, for example, texts, images, videos, or audios. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, data (e.g., data representing various types of information or content) may be sent between servers associated with social-networking system 160 and individual client systems 130 via network 110. When two electronic devices (e.g., a server and a client) are connected to a network (e.g., a computer or communications network, such as network 110), data may be transmitted between the two devices over the network using one or more suitable network protocols. A network may include any number of sub-networks. By transmitting data between the two devices, the two devices may communicate with each other.

In network communications, there are two ways to send a communication (i.e., data) from one device to another device: push and pull. With push technology, the request for the communication transaction is initiated by the sending device. That is, the sending device "pushes" the communication, so to speak, to the receiving device. In this case, the sending device may be considered the active party and the receiving device may be considered the passive party in the transaction. In contrast, with pull technology, the request for the communication transaction is initiated by the receiving device. That is, the receiving device "pulls" the communication, so to speak, from the sending device. In this case, the sending device may be considered the passive party and the receiving device may be considered the active party in the transaction. In particular embodiments, a server associated with social-networking system 160 may push data to a client system 130. A communication pushed from a server to a client may be referred to as a "push notification". Similarly, a client system 130 may push data to a server associated with social-networking system 160.

In particular embodiments, a client system 130 may be a mobile electronic or computing device. A mobile electronic device—such as a Smartphone, tablet computer, or laptop computer—may include functionality for determining its location, direction, or orientation, such as a GPS receiver, compass, or gyroscope. Such a mobile device may also include functionality for wireless communication, such as BLUETOOTH communication, near-field communication (NFC), or infrared (IR) communication or communication with a wireless local area networks (WLANs) or cellular-telephone network. Such a mobile device may also include one or more cameras, scanners, touchscreens, microphones, or speakers. Mobile electronic devices may also execute software applications, such as games, web browsers, or social-networking applications. With social-networking applications, users may connect, communicate, and share information with other users in their social networks.

Figure 2A:
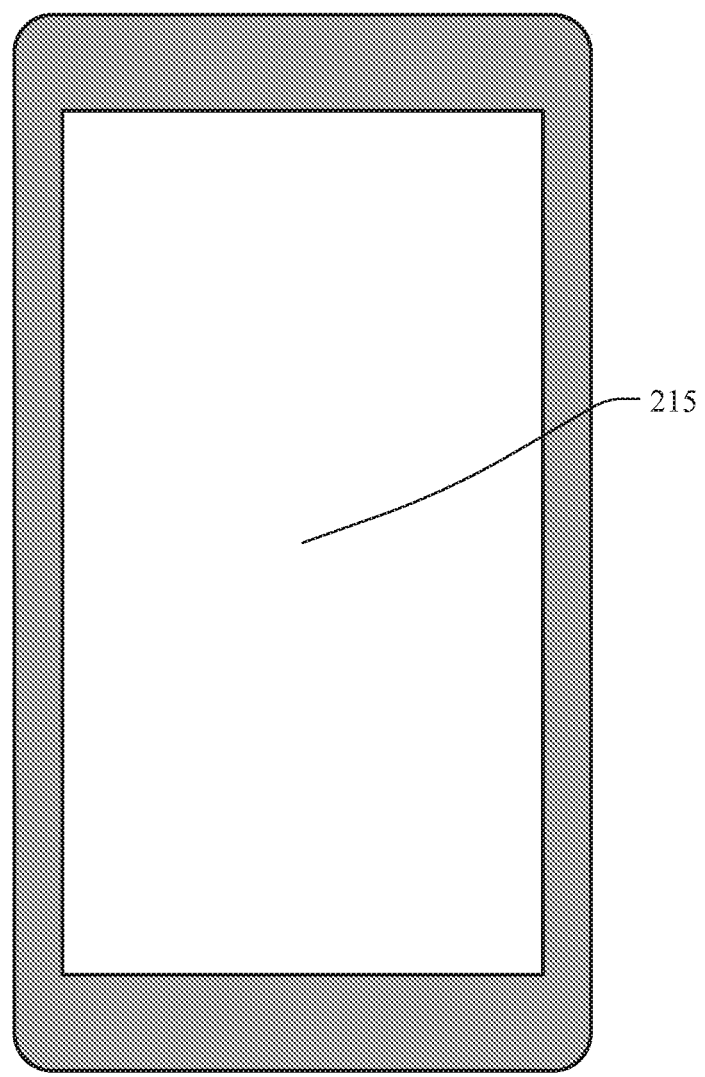
FIGS. 2A and 2B illustrate two example mobile electronic devices.

In particular embodiments, a mobile electronic device (e.g., Smartphone or tablet computer) may include a touchscreen capable of receiving touch input. FIG. 2A illustrates an example mobile electronic device 210 (e.g., a Smartphone) having a touchscreen 215. Touchscreen 215 may incorporate one or more touch sensors and a touch-sensor controller for detecting the presence and location of a touch (e.g., from a user's finger) or the proximity of an object (e.g., a stylus). In particular embodiments, a specific touch detected via touchscreen 215 may result in a touch input event.

Figure 2B:
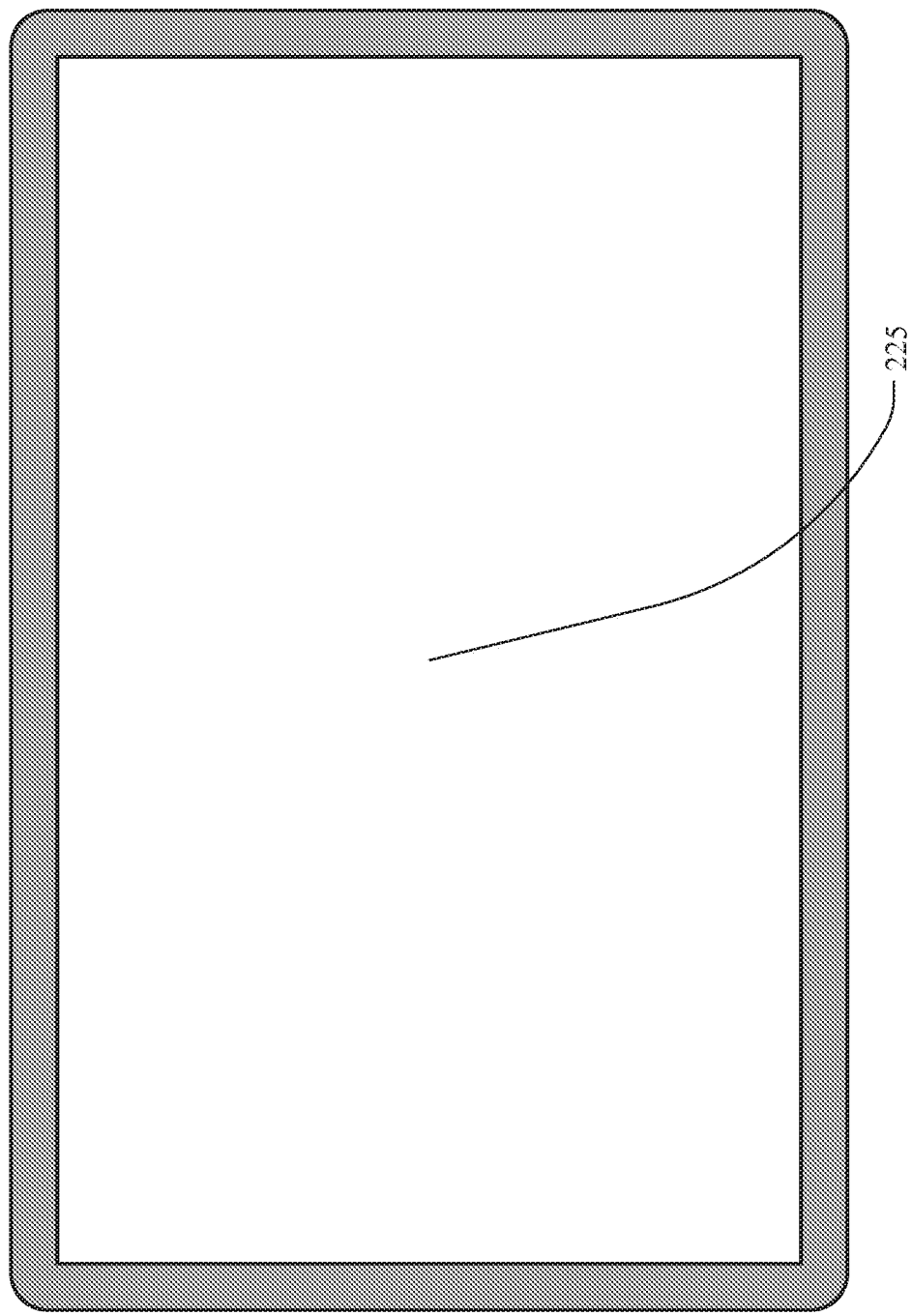

Different mobile electronic devices may have different designs. As a result, the size, shape, or aspect ration of the touchscreens of different mobile devices may differ. FIG. 2B illustrates another example mobile electronic device 220 (e.g., a tablet computer) having a touchscreen 225. Similarly, touchscreen 225 may incorporate one or more touch sensors and a touch-sensor controller for detecting the presence and location of a touch (e.g., from a user's finger) or the proximity of an object (e.g., a stylus). A specific touch detected via touchscreen 225 may result in a touch input event. However, since mobile electronic devices 210 and 220 are two different types of devices, their respective touchscreen 215 and 225 have different sizes and aspect ratios.

There may be various types of touches or gestures, such as single tap, double tap, short press, long press, slide, swipe, flip, pinch open, pinch close, pan, or drag, corresponding to various types of touch input events. Different touch input events may result in different responses and this disclosure contemplates any applicable gesture.

Social-networking system 160 may store various types of data including, for example, user data, application data, or social data. In particular embodiments, such data may be stored in a graph having any number of nodes and edges, where each edge connects two nodes. The graph is often referred to as a "social graph" or "open graph" as it contains, among others, social information.

Figure 3:
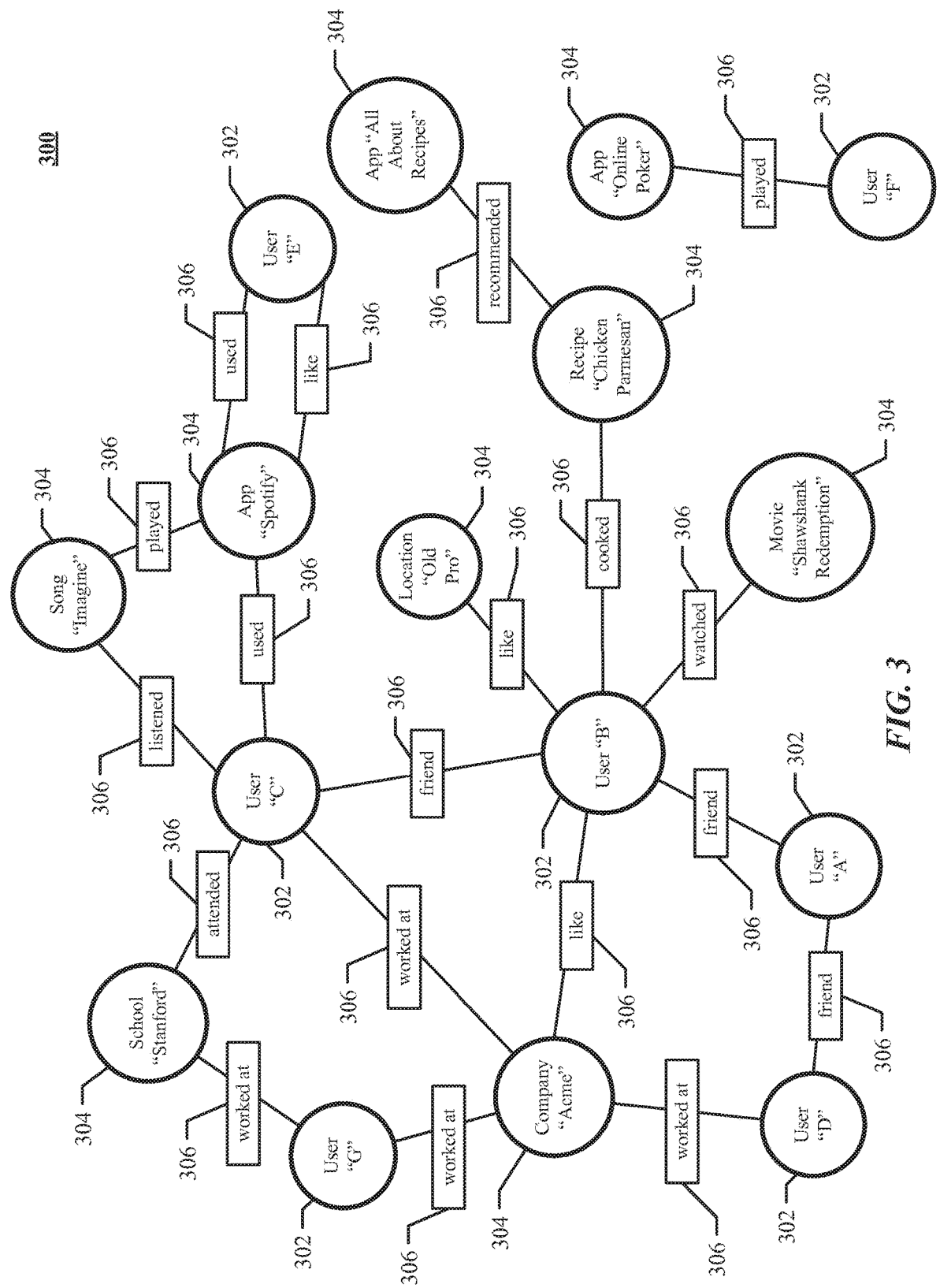
FIG. 3 illustrates an example social graph.

FIG. 3 illustrates example social graph 300. In particular embodiments, social-networking system 160 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 160, client system 130, or third-party system 170 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 160. In particular embodiments, a user node 302 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more webpages.

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 304 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to one or more webpages.

In particular embodiments, a node in social graph 300 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 306 connecting the first user's user node 302 to the second user's user node 302 in social graph 300 and store edge 306 as social-graph information in one or more of data stores (e.g., data stores associated with social-networking system 160). In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 160 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships. As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 160 may create an edge 306 between a user node 302 and a concept node 304 in social graph 300. As an example and not by way of limitation, a user viewing a concept-profile page (such as, for example, by using a web browser or a special-purpose application hosted by the user's client system 130) may indicate that he or she likes the concept represented by the concept node 304 by clicking or selecting a "Like" icon, which may cause the user's client system 130 to transmit to social-networking system 160 a message indicating the user's liking of the concept associated with the concept-profile page. In response to the message, social-networking system 160 may create an edge 306 between user node 302 associated with the user and concept node 304, as illustrated by "like" edge 306 between the user and concept node 304. In particular embodiments, social-networking system 160 may store an edge 306 in one or more data stores. In particular embodiments, an edge 306 may be automatically formed by social-networking system 160 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

In particular embodiments, a set of objects may be organized into a hierarchy based on, for example, how the individual objects are related to each other. An object hierarchy may have any number of levels, and at each level, there may be any number of objects. Parent-child or sibling relationships may exist between specific objects in the hierarchy. Within an object hierarchy, a parent object is one level above the level of its child objects. Two sibling objects are at the same level and share the same parent object. In addition, any portion of the hierarchy may also be considered a hierarchy in itself.

Figure 4:
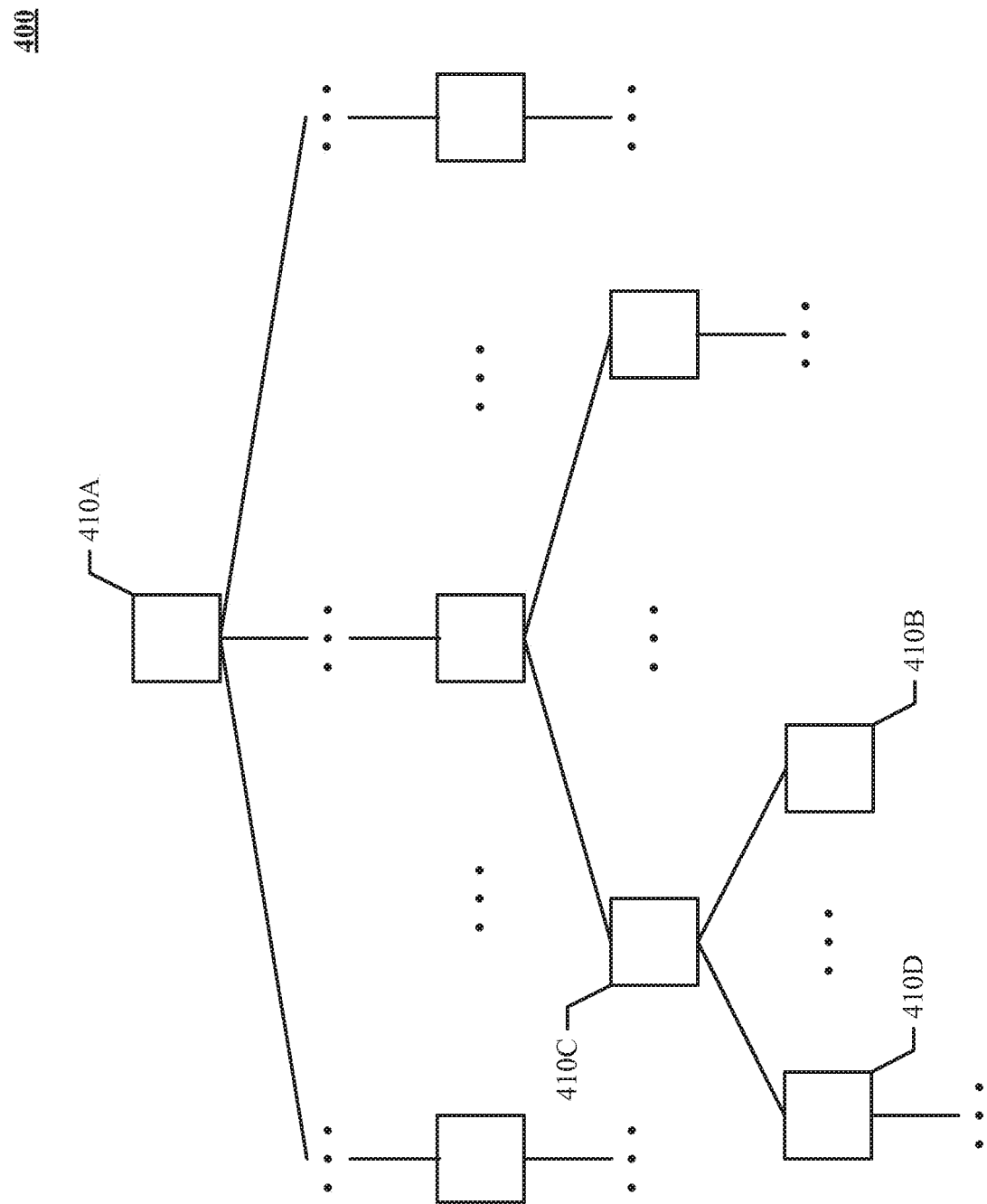
FIG. 4 illustrates an example object hierarchy.

FIG. 4 illustrates a portion of an example object hierarchy 400 that includes a number of objects 410. FIG. 4 is in fact a visual representation of an object hierarchy. Each node represents a specific object in the hierarchy, and each edge connecting two nodes represents a parent-child relationship between the two corresponding objects.

In particular embodiments, an object in a hierarchy may or may not have a parent. If an object does not have a parent, it may be referred to as a "root" object (e.g., object 410A). Typically, the root object is positioned at the first or topmost level of the hierarchy. In particular embodiments, an object in a hierarchy may or may not have any children. If an object does not have any children, it may be referred to as a "leaf" or "terminal" object (e.g., object 410B). If an object does have children (e.g., object 410C), it may have any number of children. In addition, objects sharing the same parent may be referred to as each other's "siblings". For example, in FIG. 4, object 410C is the parent of objects 410D and 410B. Objects 410D and 410B are the children of object 410C and are siblings to each other. Thus, a hierarchy of objects (e.g., object hierarchy 400) not only includes the individual objects (e.g., objects 410) themselves but also indicates the relationships among the specific objects. Moreover, the position of a specific object within the hierarchy may indicate its relationships with other objects in the hierarchy.

Objects 410 may be of various types, and this disclosure contemplates any applicable object types. For example and without limitation, the term "object" may refer to any type of content, including but not limited to images, videos, captions, text blocks or boxes, user-interface elements, clickable links, newsfeed stories, references to other objects, advertisements, calendar events, units for displaying open graph analysis that may be graphically rendered, applications, websites, web pages, books, chapters. In particular embodiments, given a hierarchy of objects, which may be a portion of another, larger hierarchy of objects, the hierarchical relationships (e.g., parent-child or sibling relationships, positions of the objects within the hierarchy) between specific objects may direct some aspects of how these objects behave in the context of a user interface or how the objects are presented to a user.

As an example, in the context of the desktop of a computing device, the desktop may be a parent object, and sometimes the root object of a hierarchy, whose child objects are the individual software applications available on the desktop. A software application, while itself being one of the child objects of the desktop, is also the parent object of the individual components of that software application. Different software applications may include different components. For example, for a software application that manages digital books (e.g., a book reader application), its components may include the digital books available, the individual chapters of each book, the pages of each chapter, and the texts, images, videos, audios, or other content or media elements on each page. Each of these also corresponds to an object (e.g., user-interface component) in the hierarchy. More specifically, within the hierarchy, the digital book application may be the parent object of the digital books. A digital book may be the parent object of the individual chapters of that book. A chapter, while itself being one of the child objects of the book, is also the parent object of the pages in that chapter. A page is the parent object of the texts, images, videos, audios, or other content or media elements on that page. A text block, image, video, audio, or other content or media element is one of the child objects of the page to which it belongs. Similarly, for a software application that manages news feeds, its components may include the individual news channels and the news stories within each channel. Each of these may correspond to an object. Within the hierarchy, the news-feed application, while itself being one of the child objects of the desktop, is also the parent object of the news channels. A news channel in turn is the parent object of the news stories included in that channel.

As another example, in the context of the Internet or the World Wide Web, the Internet may be a parent object whose child objects are the individual websites. A website, while itself being one of the child objects of the Internet, is also the parent object of the individual web pages of that website. A web page, while itself being one of the child objects of the website to which it belongs, is the parent object of the texts, images, videos, audios, or links (e.g., Uniform Resource Locators (URLs)) included in the web page. Each text block, image, video, audio, or link may also correspond to a specific object in the hierarchy.

As a third example, a website, such as a social-networking website implemented by social-networking system 160, may also be arranged in a hierarchical structure for navigating the content of the social-networking website. In this context, the social-networking website may be a parent object whose child objects are the components (e.g., photo albums, user profile pages, etc.) of the website. For example, a photo album, while itself being a child object of the social-networking website, may in turn be a parent object, and the individual photos within the album may be the child objects of the photo album. A user's profile page may be structured in such a hierarchical fashion as well. The profile page itself may be considered a parent object, and the individual objects on the profile page may be the child objects of the profile page. In particular embodiments, a profile page may be considered and rendered (e.g., for presentation to a user) as a linear timeline of objects, such as, for example and without limitation, photos, photo albums, check-ins, comments from other users, attended events, tags, applications the user has added to the profile page, stories, songs the user has listened to, playlists. These various types of objects may all be children of the profile page, or may be further arranged into multiple levels. With some implementations, a user's profile page may include any number of sections, such as the user's education and employment information, the user's public "wall", or the user's social connections. Then the various types of objects above may be divided into specific sections.

In particular embodiments, an object 410 may be a component of a user interface. In this case, object hierarchy 400 may correspond to the user interface, and each object 410 may correspond to a specific component of the user-interface. A user interface may have various types of components, and this disclosure contemplates any applicable user-interface component types. For example, a user-interface component (i.e., an object 410) may be a window, a section, a tab, an image, a video, an audio, a text block, a menu, an icon, a button, a checkbox, a website, a web page, a frame, a clickable link, a message, a post, or an input field. In particular embodiments, an object 410 may be consumed by a user if the user is able to, for example and without limitation, interact with, view, read, listen to, manipulate, or handle the object 410. For example, some user-consumable objects 410 may be texts, images, videos, audios, feeds, executables (e.g., application programs or games), websites, web pages, digital books, photo albums, posts, or messages.

In particular embodiments, when the user interface corresponding to object hierarchy 400 is displayed (e.g., on a client system 130), the structure of the corresponding object hierarchy 400 may reflect the structure of the user interface. The relationships among the individual components in the user interface, as reflected in object hierarchy 400, may influence how these components are organized and presented to users. The user interface may have any number of layers, respectively corresponding to the individual levels of object hierarchy 400. Objects 410 (e.g., user-interface components) at a specific level of object hierarchy 400 are displayed in the corresponding layer of the user interface. With some implementations, the lowest or bottommost layer of the user interface corresponds to the first or topmost level of object hierarchy 400. Thus, root object 410A is displayed in the lowest layer of the user interface. Furthermore, in the user interface, each object 410 (e.g., user-interface component) is displayed in a layer immediately above the layer where its parent, if one exists, is displayed and immediately below the layer where its children, if any, are displayed.

Sibling objects 410 are displayed at the same layer. Thus, the position of a component in the user interface indicates its relationships (e.g., parent-child or sibling) with other components in the user interface.

In particular embodiments, a user-interface component (e.g., an image, a video, a folder, etc.) may be displayed in various display modes. As an example, the user-interface component may be displayed in a "full-screen" mode, where the user-interface component occupies the entire or nearly the entire display area (e.g., the screen of an electronic device). As another example, the user-interface component may be displayed in an "on-page" mode, where the user-interface component is included in another user-interface component and displayed as a part of that other user-interface component (e.g., an image is displayed as a part of a web page). As a third example, the user-interface component may be displayed in an "index" mode, where the user-interface component is a part of a series of user-interface components (e.g., an image is displayed together with other images from the same album, or a chapter of a book is displayed in the table of content of the book together with other chapters from the same book).

In particular embodiments, a hierarchical user interface may be used to present content to a user. Such a user interface may be referred to as a "content feed" or "news feed" user interface. The content may be of any type and format, such as, for example and without limitation, text, icon, image, video, audio, web page, post, or message. This disclosure contemplates any applicable content type and format. In particular embodiments, the individual content items (e.g., text, image, video, audio, web page, post, message, news piece, etc.) may be organized into various categories, referred to as content sections. For example, related content items may be categorized into the same content section. The user interface may include any number of content sections, and each content section may include any number of content items. Hierarchically, a content section may be the parent of the content items belonging to that section. For example, various photos taken during a holiday trip may be organized into the same album, and various photo albums may be organized into the photo section of the user interface.

In particular embodiments, a user may consume or interact with a specific content item. For example, a user consumes a content item when the user scrolls, opens up, views, listens to, selects, reviews, or comments on the content item. A user interacts with a content item when the user selects, clicks on, taps, reviews, or comments on the content item. This disclosure contemplates any applicable means for a user to consume or interact with a content item.

Figure 5:
FIG. 5 illustrates an example content item.

As described above, in particular embodiments, in a hierarchical user interface, a content item may include any number of other content items. FIG. 5 illustrates an example content item 510. Here, content item 510 is associated with a newspaper (e.g., the New York Times). More specifically, content item 510 is an online publication of the newspaper. Content item 510 includes several other content items, such as a logo 531 and the name 532 of the newspaper and an introduction 533 (e.g., a text block) of an article. In addition, content item 510 includes an icon 520 (e.g., an image) that represents another content item (e.g., an article published by the New York Times as described by introduction text 533). Within the hierarchical structure, content item 510 is the parent of content items 531, 532, 533, and 520. Conversely, content items 531, 532, 533, and 520 are the children of content item 510.

In FIG. 5, content item 510 is displayed on the screen of an electronic device (e.g., a mobile device such as a Smartphone). Content item 510 currently occupies the entire screen of the mobile device on which it is displayed. Suppose that a user wishes to view the content of the other content item (e.g., the article) represented by icon 520. In particular embodiments, the user may perform an action with respect to icon 520 that results in a user input to the mobile device. For example, if the mobile device has a touchscreen, the user may single or double tap on icon 520, pinch open icon 520, or swipe on icon 520 (e.g., swiping vertically in the upward direction). In particular embodiments, a user interaction with icon 520 may cause icon 520 to open up and reveal the content of the content item (e.g., the article) it represents.

In particular embodiments, in response to a user input resulted from a user interaction (e.g., upward swipe) with icon 520, an animation sequence may be displayed on the screen of the mobile device. The animation sequence may depict that icon 520 opens up (e.g., unfolds) to reveal the content of the content item it represents.

Figure 6C:
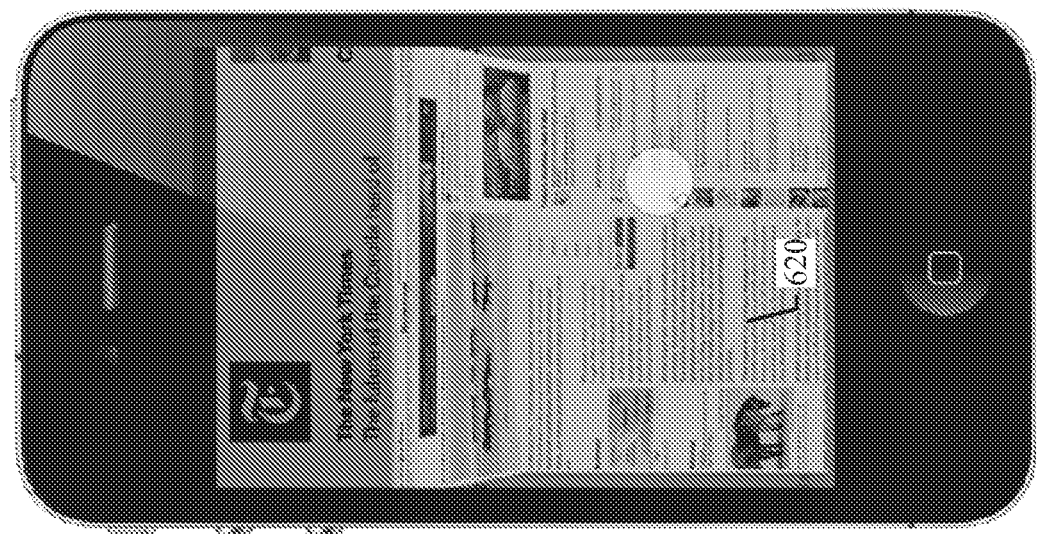
FIGS. 6A-6C illustrate an example animation sequence depicting opening up an icon to reveal a content item represented by the icon.
Figure 6B:
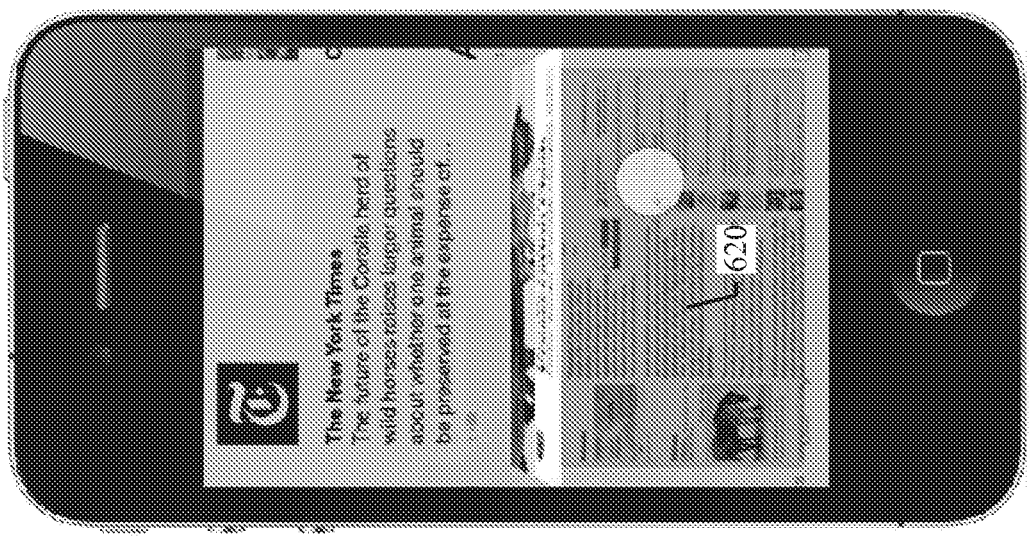
Figure 6A:

FIGS. 6A-6C illustrate an example animation sequence. Here, icon 520 appears as a piece of paper folded in half. On the outside of the folded paper is an image 610 representing the article (i.e., the content item represented by icon 520). On the inside of the folded paper is the article (i.e., content item 620) itself, which is represented by icon 520. The animation sequence depicts that icon 520 gradually unfolds, similar to a piece of folded paper gradually unfolds. As this happens, image 610 on the outside of the paper gradually disappears out of sight while content item 620 on the inside of the paper is gradually revealed. In addition, the paper gradually increases in size to fill up the entire screen.

Figure 7B:
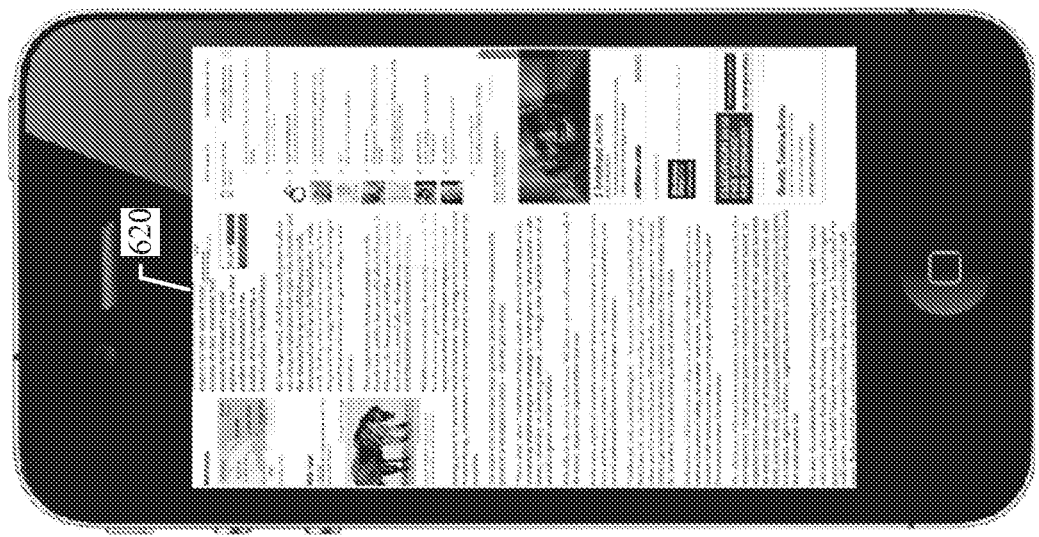
FIGS. 7A-7B illustrates an example content item represented by an icon.
Figure 7A:
Figure 8C:
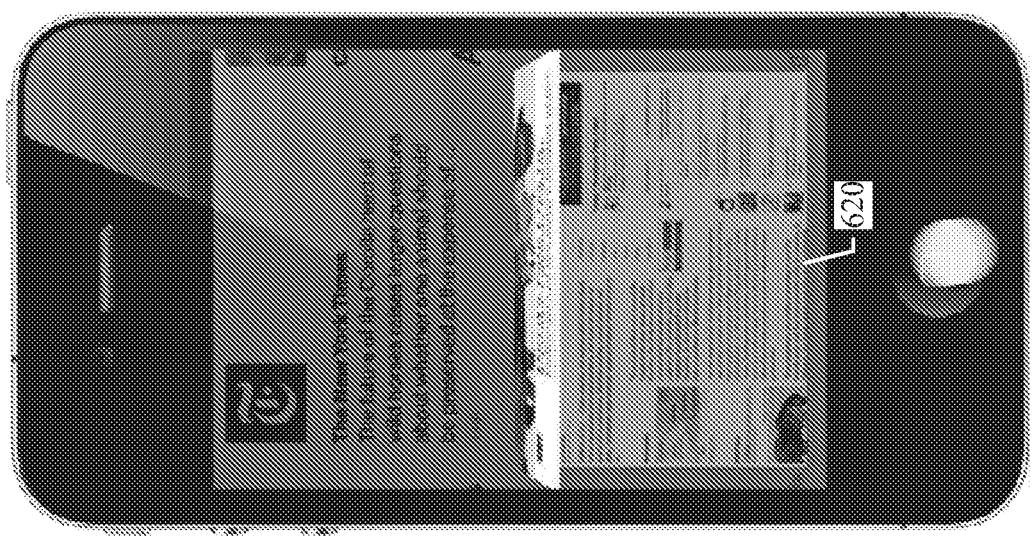
FIGS. 8A-8F illustrate an example animation sequence depicting closing down a content item.
Figure 8B:
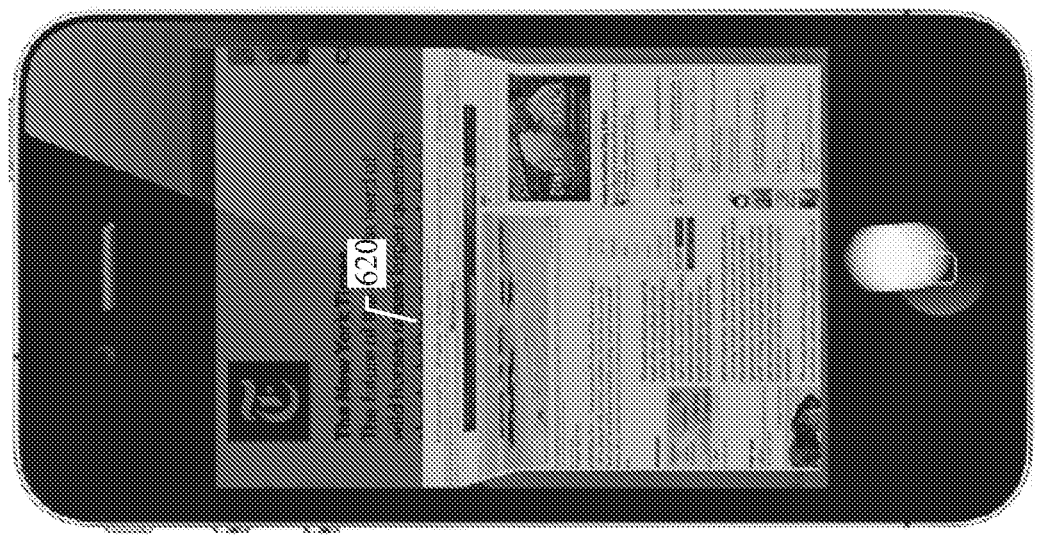
Figure 8A:
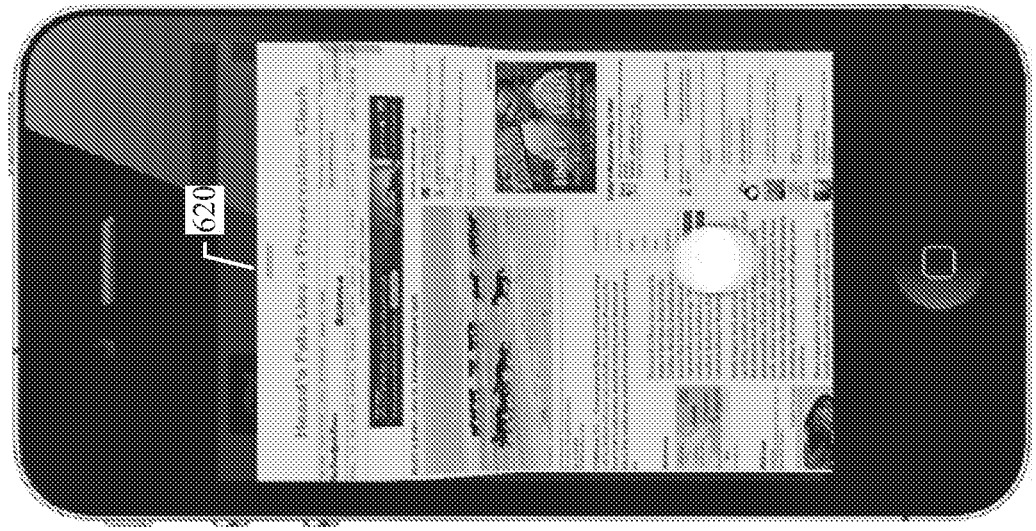
Figure 8F:
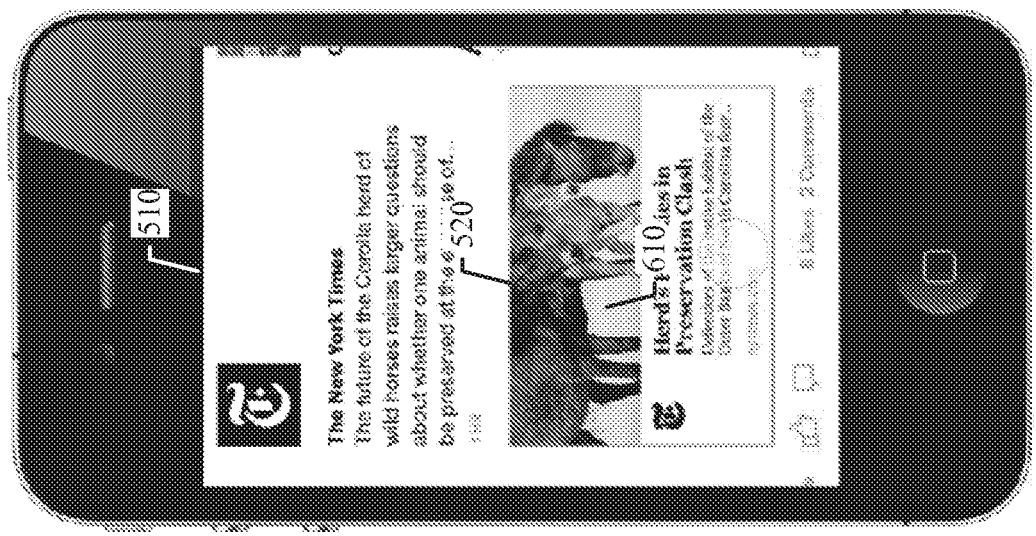
Figure 8E:
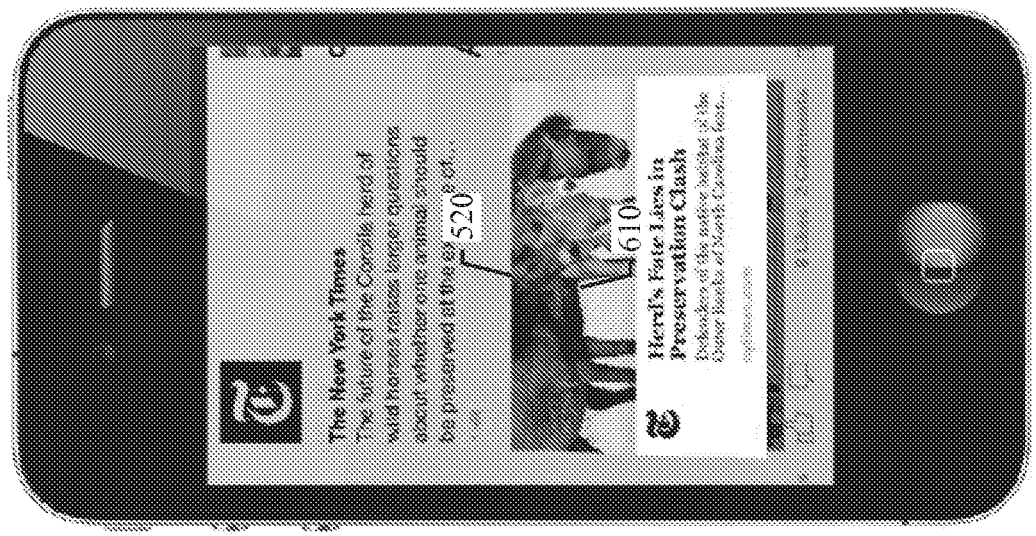
Figure 8D:

In FIG. 7A, content item 620 (i.e., the article represented by icon 520) is now fully revealed. Note that content item 620 also includes several other content items (e.g., images, buttons, text blocks, etc.). In this example, content item 620 is a web page. The user may now view the content of content item 620 as desired. For example, the user may scroll up or down the web page. In FIG. 7B, the user has scrolled to the bottom of the web page (i.e., content item 620).

In particular embodiments, when content item 620 is fully revealed at the end of the animation sequence depicting icon 520 opening up, content item 620 occupies the entire screen of the mobile device on which it is displayed, as illustrated in FIG. 7A. Consequently, content item 510 is no longer visible at this point, as content item 510 has been covered up and replaced by content item 620. In particular embodiments, in a hierarchical user interface, the content items are displayed in layers corresponding to the hierarchical structure of the user interface. For example, content item 510 may be displayed in a first layer, and content item 620 may be displayed in a second layer above the first layer. Thus, when content item 620 is displayed, it obscures content item 510 displayed in the layer below its own layer.

At any time, the user may close down content item 620 and return to content item 510 again. To do so, in particular embodiments, the user may perform an action with respect to content item 620 that results in another user input to the mobile device. For example, the user may pinch close content item 620, or swipe on content item 620 (e.g., swiping vertically in the downward direction). In particular embodiments, a user interaction with content item 620 may cause content item 620 to close down and return to icon 520, which represents content item 620.

In particular embodiments, in response to a user input resulted from a user interaction (e.g., downward swipe) with content item 620, an animation sequence may be displayed on the screen of the mobile device. The animation sequence may depict that content item 620 closes down, folds in half, and returns to icon 520 that represents content item 620.

FIGS. 8A-8F illustrate an example animation sequence. Here, content item 620 appears as a piece of paper. On the inside of the paper is the article (i.e., content item 620). On the outside of the paper is image 610 representing the article. The animation sequence depicts that content item 620 gradually folds in half, similar to a piece of paper gradually folds in half. As this happens, content item 620 on the inside of the paper gradually disappears (i.e., being covered up) while image 610 on the outside of the paper gradually appears. In addition, the paper gradually decreases in size and approaches the size of icon 520, until at the end of the animation sequence, in FIG. 8F, the display returns to content item 510, which includes icon 520 representing content item 620.

In particular embodiments, the speed at which icon 520 opens up may correspond to the speed of the user making the up swiping gesture. The faster the user swipes, the faster icon 520 opens up and vice versa. Similarly, the speed at which content item 620 folds down may also correspond to the speed of the user making the downward swiping gesture. The faster the user swipes, the faster content item 620 folds down and vice versa. With some implementations, the speed of the user's swiping gesture may be normalized by dividing the speed by a normalization factor.

Figure 9:
FIG. 9 illustrates example operations associated with a content item.

In particular embodiments, in additional to scroll through a content item, the user may also share, save, unsubscribe, report, or perform other applicable actions with respect to the content item. For example, in FIG. 9, buttons 910, 920, 930, and 940 enable the user to share (e.g., share a content item with other users such as social friends), save (e.g., save a copy of a content item), unsubscribe (e.g., unsubscribe a content item so that the user no longer receives the content item), or report (e.g., report a content item to its publisher or administrator due to inappropriate content or other reasons) content item 620. The user may click or tap a specific button to perform the corresponding action.

The content-item presentation process and the animation sequences described above may be implemented as computer software and executed on a computer system. FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a client device:
    displaying a user-interface component on a screen of the client device in an on-page mode that partially fills the screen, the user-interface component representing a content item, wherein the user-interface component is displayed as a folded piece of paper with an image on an outside of the folded piece of paper, the image providing a visual description of the information within the content item;
    receiving, at the client device, a first user input on the user-interface component, wherein the first user input is applied at a first speed;
    in response to the first user input on the user-interface component, displaying a first animation sequence depicting the user-interface component unfolding the folded piece of paper at a speed that is based on the first speed of the first user input such that the image on the outside of the folded piece of paper disappears as the folded piece of paper completely unfolds to reveal the content item in a full-screen mode that entirely fills the screen to allow a user to consume and interact with the content item;
    receiving, at the client device, a second user input on the content item, wherein the second user input is applied at a second speed; and
    in response to the second user input on the content item, displaying a second animation sequence depicting the content item closing by folding the user-interface component displayed as an unfolded piece of paper at a speed that is based on the second speed of the second user input such that the content item disappears from the screen and the image on the outside of the folded piece of paper reappears to return the user-interface component being displayed in the on-page mode that partially fills the screen.

2. The method of claim 1, wherein the first user input results from an upward swipe gesture made by the user.

3. The method of claim 1, wherein the second user input results from a downward swipe gesture made by the user.

4. The method of claim 1, further comprising:
    enabling the user to scroll through, share, save, unsubscribe, or report the content item.

5. The method of claim 1, wherein:
    the user-interface component is associated with content from an online social network;
    the content item is a web page; and
    the icon is an image.

6. The method of claim 1, wherein:
    the user-interface component and the content item are part of a hierarchical user interface having a plurality of layers;
    the user-interface component is displayed in a first layer of the hierarchical user interface; and
    the content item is displayed in a second layer of the hierarchical user interface above the first layer.

7. The method of claim 6, wherein, during the first animation sequence, the display of the user-interface component is dimmed while the display of the content item is highlighted.

8. The method of claim 7, wherein the display of the user-interface component is further dimmed until the user-interface component disappears out of sight after being replaced by the content item.

9. The method of claim 6, wherein, during the second animation sequence, the display of the user-interface component is gradually highlighted until the content item disappears from the screen after the second animation sequence.

10. The method of claim 9, wherein the display of the content item is further dimmed until the content item disappears from the screen after the second animation sequence.

11. One or more computer-readable non-transitory storage media embodying software that is operable when executed to:
    display a user-interface component on a screen of a client device in an on-page mode that partially fills the screen, the user-interface component representing a content item, wherein the user-interface component is displayed as a folded piece of paper with an image on an outside of the folded piece of paper, the image providing a visual description of the information within the content item;
    receive, at the client device, a first user input on the user-interface component, wherein the first user input is applied at a first speed;
    in response to the first user input on the user-interface component, display a first animation sequence depicting the user-interface component unfolding the folded piece of paper at a speed that is based on the first speed of the first user input such that the image on the outside of the folded piece of paper disappears as the folded piece of paper completely unfolds to reveal the content item in a full-screen mode that entirely fills the screen to allow a user to consume and interact with the content item;

receive, at the client device, a second user input on the content item, wherein the second user input is applied at a second speed; and in response to the second user input on the content item, display a second animation sequence depicting the content item closing by folding the user-interface component displayed as an unfolded piece of paper at a speed that is based on the second speed of the second user input such that the content item disappears from the screen and the image on the outside of the folded piece of paper reappears to return the user-interface component being displayed in the on-page mode that partially fills the screen.

12. The media of claim 11, wherein the first user input results from an upward swipe gesture made by the user.

13. The media of claim 11, wherein the second user input results from a downward swipe gesture made by the user.

14. The media of claim 11, wherein the software is further operable when executed to enable the user to scroll through, share, save, unsubscribe, or report the content item.

15. The media of claim 11, wherein:
the user-interface component is associated with content from an online social network;
the content item is a web page; and
the icon is an image.

16. The media of claim 11, wherein:
the user-interface component and the content item are part of a hierarchical user interface having a plurality of layers;
the user-interface component is displayed in a first layer of the hierarchical user interface; and
the content item is displayed in a second layer of the hierarchical user interface above the first layer.

17. The media of claim 16, wherein, during the first animation sequence, the display of the user-interface component is dimmed while the display of the content item is highlighted.

18. The media of claim 17, wherein the display of the user-interface component is further dimmed until the user-interface component disappears out of sight after being replaced by the content item.

19. The media of claim 16, wherein, during the second animation sequence, the display of the user-interface component is gradually highlighted until the content item disappears from the screen after the second animation sequence, and wherein the display of the content item is further dimmed until the content item disappears from the screen after the second animation sequence.

20. A system comprising: one or more processors; and a memory coupled to the processors comprising instructions executable by the processors, the processors operable when executing the instructions to:

display a user-interface component on a screen of a client device in an on-page mode where the user-interface component is included in another user-interface component and displayed as a part of the another user-interface component, wherein the display of the user-interface component partially fills the screen, the user-interface component representing a content item, wherein the user-interface component is displayed as a folded piece of paper with an image on an outside of the folded piece of paper the image providing a visual description of the information within the content item;

receive, at the client device, a first user input on the user-interface component, wherein the first user input is applied at a first speed;

in response to the first user input on the user-interface component, display a first animation sequence depicting the user-interface component unfolding the folded piece of paper at a speed that is based on the first speed of the first user input such that the image on the outside of the folded piece of paper disappears as the folded piece of paper completely unfolds to reveal the content item in a full-screen mode that entirely fills the screen to allow a user to consume and interact with the content item;

receive, at the client device, a second user input on the content item, wherein the second user input is applied at a second speed; and in response to the second user input on the content item, display a second animation sequence depicting the content item closing by folding the user-interface component displayed as an unfolded piece of paper at a speed that is based on the second speed of the second user input such that the content item disappears from the screen and the image on the outside of the folded piece of paper reappears to return the user-interface component being displayed in the on-page mode that partially fills the screen.

21. The method of claim 1, wherein:
the first user input is a first swiping gesture at the first speed; and
the second user input is a second swiping gesture at the second speed.

* * * * *